Figure 1:
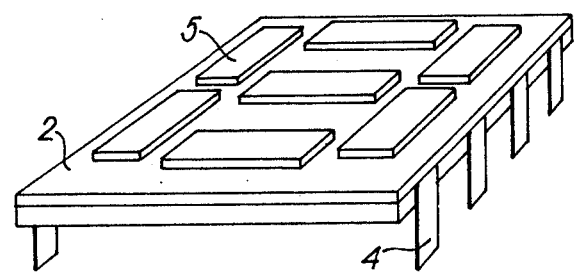

United States Patent [19]

Auzel et al.

[11] 4,032,351

[45] June 28, 1977

[54] RARE EARTH CERAMIC FOR FREQUENCY CONVERSION OF RADIATION

[76] Inventors: Francois F. Auzel, 39 Avenue Port Royal des Champs, 78320 Le Mesnil St. Denis, France; Denise M. Morin, 44, rue de Goulmiers, 94130 Nogent-Sur-Marne, France; Dario C. Pecile, 17, Boulevard Andre, 93250 Villemomble, France

[22] Filed: Jan. 19, 1976

[21] Appl. No.: 649,966

Related U.S. Application Data

[63] Continuation-in-part of Ser. No. 491,485, July 24, 1974, abandoned.

[52] U.S. Cl. .................................. 106/39.6; 106/54; 106/53; 106/73.2; 106/73.1; 106/73.5; 252/301.4 H; 252/301.4 F; 252/301.4 P
[51] Int. Cl.² ...................... C03C 3/22; C09K 11/08
[58] Field of Search ............... 106/39.6, 53, 47 R, 106/54, 73.2, 73.5, 73.1; 252/301.4 H, 301.4 F, 301.4 P

[56] References Cited

UNITED STATES PATENTS

| | | | |
|---|---|---|---|
| 3,541,018 | 11/1970 | Hewes et al. | 252/301.4 F |
| 3,663,474 | 5/1972 | Lee et al. | 252/301.4 F |
| 3,709,827 | 1/1973 | Auzel | 252/301.4 R |
| 3,816,576 | 6/1974 | Auzel | 252/301.4 F |

*Primary Examiner*—Winston A. Douglas
*Assistant Examiner*—John F. Niebling

[57] ABSTRACT

A rare earth ceramic having a microcrystal phase buried in a glassy phase for the coversion of radiation in the near-infrared band from about 0.85 to 1.06 um into visible light. It comprises a mixture of lead fluoride $PbF_2$, ytterbium oxide $Yb_2O_3$, at least one glass-forming oxide selected from the oxides of B, Si, P, Ge, Te, and at least one compound of a rare earth doping element chosen as a function of the desired emission color, i.e.

a compound containing thulium ions $Tm^{3+}$ for a blue emission mixture;
a compound containing erbium ions $Er^{3+}$ for a green emission mixture;
a compound containing holmium ions $Ho^{3+}$ for a green emission mixture;
a compound containing erbium ions $Er^{3+}$ for a red emission mixture, whereby the oxygen ions from the oxides are exclusively located in the glassy phase while ytterbium and the rare earth are exclusively located in the microcrystal phase.

The relative proportion of the glass-forming oxides to the ytterbium oxide and lead fluoride, the relative proportion of ytterbium oxide to the glass-forming oxides and lead fluoride and the relative proportion of doping rare earths in the form of oxides to the finished ceramic must lie within respective predetermined ranges.

6 Claims, 2 Drawing Figures

RARE EARTH CERAMIC FOR FREQUENCY CONVERSION OF RADIATION

The present application is a continuation-in-part of application Ser. No. 491,485 filed July 24, 1974 and now abandoned.

This invention relates to rare earth ceramics which allow radiation in the near infrared band (about 0.85 to 1.06 μm) to be converted into visible light.

Compositions (and screens) which can be used for optical conversion of the type referred to above are known in the art. For example, there are already known from French Patent 1,532,609 filed June 1, 1967:

a. a double tungstate of an alkaline metal and ytterbium, slightly doped with a double tungstate of an alkaline metal and erbium which has a green response to infrared illumination;

b. a double tungstate of an alkaline metal and ytterbium, slightly doped with a double tungstate of an alkaline metal and thulium which has a blue response to infrared illumination.

The technical literature gives quantitative formulations of these compositions as well as methods of preparing them in the form of powders and applications to the production of screens which are optical converters in particular by packing powder between glass sheets, by causing the powder to sedimentate in a resin and gluing to a suitable support, of by dispersing the powder in a gel.

The physical phenomena of photoluminescence involved are the subject matter of two reports given to the Academie des Sciences de Paris, year 1966, volume 262, pages 1016 to 1019 and volume 263, pages 819 to 821.

Further compositions, in the form of microcrystals, which do differ from the preceding ones only in the host material, are indicated in the literature:

c. simple lanthanum fluorides ($LaF_3$), gadolinium fluorides ($GdF_3$), yttrium fluorides ($YF_3$) doped with ytterbium ($Yb^{3+}$) and either erbium ($Er^{3+}$) (for green response) or thulium ($Tm^{3+}$) (for blue response), or holmium ($Ho^{3+}$) for green response);

d. mixed barium and yttrium fluorides ($BaYF_5$), barium and lanthanum fluorides $BaLaF_5$) doped with ytterbium and either erbium (for green or red response respectively), or thulium (for blue response), or holmium (for green response);

e. yttrium oxychlorides (YOCl, $Y_3OCl_7$) doped with ytterbium and erbium (mainly for red response).

As far as these microcrystals are concerned, which are obtained from a fusion bath (c,d) or probably by evaporation (e), reference should be made to the following articles:

c. HEWES and SARVER, "Bulletin of the American Society," 1968, vol. 13, page 687, and "Physical Review" June 1969, vol 182, page 427;

KINGSLEY, FENNER and GALGINATIS, "Applied Physics," Aug. 15, 1969, page 115;

d. GUGGENHEIM and JOHNSON, "Applied Physics Letters," June 15, 1969, pages 51 and 52;

e. VAN UITERT, SINGH, LEVISTEIN, JOHNSON and GRODKIEWICZ, "Applied Physics Letters," June 15, 1969, pages 53 and 54.

The above optical conversion materials (a) to (e) are in crystalline or vitreous form.

The invention originates from the fact that the emission efficiency of the ion $Er^{3+}$ in the green is a function, for a given composition, of the physical state (crystalline, vitreous or ceramic). On this subject matter, reference should be made to the article "Application of energy resonant transfer to the laser effect of glass doped with $Er^{3+}$" published in "Annales des Télécommunications," vol. 24, September–October 1969, pages 363 to 376. Thus the emission is very weak in the glass except the germanate glass, but becomes very high in a devitrified glass which can be considered as similar to a ceramic material.

This phenomenon of increased emission in the ceramic state already applies to the conventional emission called "stokes" emission, i.e. when the emission wavelength is greater than the excitation one. The U.S. Pat. Nos. 3,709,827 and 3,816,576 respectively issued Jan. 9, 1973 and June 9, 1974, have already shown that the same occurs in the case of an "antistokes" emission.

According to a first aspect of the invention, there is provided a rare earth ceramic for the conversion of radiation in the near-infrared band (about 0.85 to 1.06 μm) into visible light, comprising a mixture of lead fluoride ($PbF_2$), ytterbium oxide ($Yb_2O_3$), at least one so-called glass-forming oxide chosen from the group including $B_2O_3$, $SiO_2$, $GeO_2$, $P_2O_5$, $TeO_2$ and at least one compound of a rare earth element chosen as a function of the desired emission colour, i.e.

a compound containing the thulium ion ($Tm^{3+}$) for a blue emission mixture;

a compound containing the erbium ion ($Er^{3+}$) or holmium ion ($Ho^{3+}$) for a green emission mixture; or a compound containing the erbium ion ($Er^{3+}$) for a red emission mixture.

Contrary to the prior U.S. Pat. Nos. 3,709,827 or 3,816,576, the presence of oxygen is allowed and does not reduce the up-converting efficiency. This is contrary to what should be expected from the usual state of the art. As can be seen from a paper by T. MATSUBARA ("A proposed method for predicting emission in $Er^{3+}$ and $Yb^{3+}$ doped phosphors," Japan Journal of Applied Physics, Vol. 11, 1972, pages 1579–1580), oxygen containing hosts should be less efficient for green emission, since phonon energies increase, so increasing the non radiative decay to the red emitting level. This prediction is confirmed by results from MURAN and SZILAGYI which have been presented at the Electrochemical Society meeting in Cleveland in 1971 and which have been reprinted in the Proceeding of the I.E.E.E., Vol. 61 (1973), page 778. To the opposite of this last result, the new vitroceramics have a particular behaviour which can be understood from their microscopic structure as is explained later.

The lead fluoride, in the amount range hereinafter indicated, ensures the obtainment of microcrystals containing rare earths including ytterbium said microcrystals growing, upon being cooled, and going embedded in a mass of glass substantially consisting of the so-called glass-forming oxides.

The presence of the ytterbium ensures that a glass will not be obtained nor even if a tempering operation is carried out. A ceramic vitreous to a greater or less extent will be obtained instead.

However, from the examples given below, it will be appreciated that the conversion efficiency of the proposed ceramics are higher than that of the mixtures mentioned at (a), (b) and (c) comprising fluorides as well as tungstate mixtures.

Preferably, the ratio between the glass-forming oxides and the whole of these oxides and lead fluoride ranges from about 6 to 35% by weight; the ratio between the ytterbium oxide and the whole of the glass-forming oxides and lead fluoride ranges from about 5 to 20% by weight; and the ratio of the doping rare earth, considered in the form of oxide, and the final ceramic ranges from about:

0.01 to 5% by weight for the oxide $Er_2O_3$;
0.003 to 0.25% by weight for the oxide $Tm_2O_3$;
0.01 to 2% by weight for the oxide $Ho_2O_3$.

As far as the first ratio is concerned, it is preferable to choose in the corresponding range a proportion as low as possible of forming oxides in order to correspondingly decrease the proportion of oxidised ions finally existing in the host.

Various micrographic tests made on samples of these ceramics by means of an electronic microscope have shown mainly two facts that explain the behaviour of the vitroceramics, two facts which are essentially a double segregation:

1. Rare-earth ions concentrate in the microcrystal phase and not in the glassy phase.
2. The microcrystal phase does not contain oxygen which seems to be concentrated only in the glassy phase.

These two facts explain why the up-converting efficiency is much better than for any other known oxidic host and slightly better than for other fluoridic hosts.

Knowing that there exists an optimum proportion of ytterbium in the microcrystals at which the conversion efficiency of the ceramic if greatest, the conclusion was reached that it was advantageous to dilute ytterbium a little.

Preferably, the ceramic also comprises at least one oxide of an optically neutral rare earth selected from the group comprising Y, La, Gd, Lu.

In a ceramic of this kind, the ratio of the total ytterbium oxide and oxide of neutral rare earth to the glass-forming oxides and lead fluoride ranges from about 5 to 20% by weight; and the molar ratio of neutral rare earth oxide to ytterbium oxide ranges from about 1 to 10% and is preferably equal to 2%.

According to a second aspect of the invention, there is provided a method of preparing rare earth ceramics comprising: thoroughly mixing in a mortar microcrystalline powders with a high purity; melting the mixture in a platinum crucible by putting the same in a free air muffle furnace whose temperature is first increased up to about 900° C in about 15 minutes for causing a pre-reaction, and then up to 1000° C in about 10 minutes to 2 hours for melting the mixture; pouring the product obtained into a mould of suitable shape for the intended use and cooled down to the ambient temperature; and annealing the moulded ceramic obtained in a furnace whose temperature is raised to about 200° to 320° C in about 3 to 4 hours.

It should be noted that this method is much simpler and easier than that of the polycrystalline hosts containing fluorine since it does not need a particular controlled atmosphere (vacuum or hydrofluoric gas) or the risky use of beryllium fluoride or ammonium fluoride as a flux and this without involving a substantial reduction in the emission efficiency, as one would have expected, bearing in mind that the presence of oxygen is noxious in the compositions containing fluorine (see references mentioned above at (c) and (d)).

The final annealing which is simply intended to eliminate internal stresses is not necessary if the ceramic is crushed and ground into a powder usable as above either through packing between two plain glass sheets parallel to one another or through sedimentation in a synthetic transparent resin for coating and gluing to a suitable support by polymerization of the resin, or through dispersion in a gel such as a silicone grease.

Figure 2:
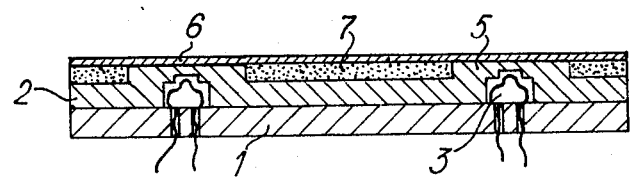

The invention will now be described in more detail, by way of example only, with reference to the following examples and the accompanying drawings, in which:

FIGS. 1 and 2 are respectively a perspective and cross-sectional view of a seven-segment display.

Four examples of optical conversion ceramic materials, two without an optically neutral rare earth element and two with such an element, with which particularly good results have been obtained are given below.

EXAMPLE 1

The following table gives the composition of an optical conversion ceramic compound according to the invention referred to as (A) together with the relative conversion efficiency thereof as compared with prior art optical conversion polycrystalline compounds disclosed in paragraph (c) above, and in French patent 1,532,609 and vitroceramic compound disclosed in U.S. Pat. Nos. 3,709,827 or 3,816,576.

| Emission colour | Host reference | Composition of the host | relative conversion efficiency | State of the host |
|---|---|---|---|---|
| green | (c) | $YF_3$:Yb:Er | 100 | polycrystalline |
| 2 | (c) | $LaF_3$:Yb:Er | 89 | polycrystalline |
|  | French patent 1,532,609 (1967) | $(WO_4)_2$ Na Yb:Er | 5 | polycrystalline |
|  | U.S. Pat. Nos. 3,709,827 3,816,576 | $BeF_2$, $PbF_2$, $MgF_2$, $YbF_2$, $ErF_2$ | 50 | vitroceramic |
|  | (A) | $GeO_2$, $PbF_2$, $Yb_2O_3$, $Er_2O_3$ | 154 | vitroceramic |

EXAMPLE 2

The following table gives the composition of an optical conversion ceramic compound according to the invention referred to as (B) together with the relative conversion efficiency thereof as compared with a prior art optical polycrystalline compound disclosed in paragraph (b) above.

| Emission colour | Host reference | Composition of the host | relative conversion efficiency | State of the host |
|---|---|---|---|---|
| blue | (a) | (WO$_4$)$_2$<br>NaLa:Ym:Tm | 100 | polycrystalline |
|  | (B) | PbF$_2$, SiO$_2$<br>Yb$_2$O$_3$, Tm$_2$O$_3$ | 6250 | ceramic |

It should be noted, for both columns, that comparison is given with (WO$_4$)$_2$ Na La:Yb:Er and (WO$_4$)$_2$ Na La: Yb:Tm because they are the best representative for oxidic hosts and that the new vitroceramics are also, as a whole, oxidic hosts. In both tables, the improvement is of several tenths respectively about 30 (green) and 60 (blue). The formulations (by weight) of these hosts were as follows:

| Ref. (A) Green emission: | PbF$_2$ | 70.5 | % |
|---|---|---|---|
|  | GeO$_2$ | 19.8 | % |
|  | Yb$_2$O$_3$ | 9.0 | % |
|  | Er$_2$O$_3$ | 0.7 | % |
| Ref. (B) Blue emission: | PbF$_2$ | 77.40 | % |
|  | SiO$_2$ | 6.00 | % |
|  | Yb$_2$O$_3$ | 16.55 | % |
|  | Tm$_2$O$_3$ | 0.55 | % |

EXAMPLE 3

The following table gives the composition of an optical conversion ceramic compound according to the invention referred to as (A') and derived from (A) by addition of a neutral rare earth oxide, namely Y$_2$O$_3$

| Host reference | Composition of the host | Molar % | % by weight | Relative conversion efficiency |
|---|---|---|---|---|
| (A) | PbF$_2$ | 57.48 | 70.5 |  |
|  | GeO$_2$ | 37.66 | 19.8 |  |
|  | Yb$_2$O$_3$ | 4.50 | 9.0 | 100 |
|  | Er$_2$O$_3$ | 0.36 | 0.7 |  |
| (A') | PbF$_2$ | 66.86 | 76.28 |  |
|  | GeO$_2$ | 26.89 | 13.09 |  |
|  | Y$_2$O$_3$ | 1 | 1.05 | 130 |
|  | Yb$_2$O$_3$ | 4.85 | 8.89 |  |
|  | Er$_2$O$_3$ | 0.39 | 0.69 |  |

EXAMPLE 4

The following table gives the composition of an optical conversion ceramic compound according to the invention referred to as (B') and derived from (B) by addition of a neutral rare earth oxide, namely Y$_2$O$_3$

| Host reference | Composition of the host | Molar % | % by weight | Relative conversion efficiency |
|---|---|---|---|---|
| (B) | PbF$_2$ | 64.78 | 71.3 |  |
|  | GeO$_2$ | 25.88 | 12.15 |  |
|  | Yb$_2$O$_3$ | 9.31 | 16.48 | 100 |
|  | Im$_2$O$_3$ | 0.029 | 0.05 |  |
| (B') | PbF$_2$ | 64.07 | 70.47 |  |
|  | GeO$_2$ | 25.59 | 12.01 |  |
|  | Y$_2$O$_3$ | 1 | 1.01 | 120 |
|  | Yb$_2$O$_3$ | 9.31 | 16.46 |  |
|  | Tm$_2$O$_3$ | 0.029 | 0.05 |  |

Relative efficiency measurements are performed according to the procedure detailed in a paper entitled "Comparison and Efficiency of Materials for Summation of Photons Assisted by Energy Transfer" by F. AUZEL and D. PECILE, which has been published in Journal of Luminescence, Vol. 8, (1973), pages 32–43. The described method has been confirmed by results presented by A. BRIL, J. L. SOMMERDIJK, A. W. JAGER in Journal of the Electrochemical Society, vol. 122, (1975), pages 660.

The references to the prior art mentioned above suggest various applications of optical converters. The described ceramic, however, are particularly suitable for forming display devices such as the one described below.

A numerical display in the solid state of the seven segment type shown in FIGS. 1 and 2 comprises a metal support 1 formed with recesses filled with insulating material through which connecting wires extend. A ceramic plate 2 has recesses formed in its under side for locating infrared electroluminescent diodes 3 enveloped by a glass having a high refraction index, each diode 3 being connected on the one side to the metal support 1 and on the other to connection wires leading to an outer tongue 4. Segments 5 of an optical conversion ceramic material bridge said diodes.

A display in which each segment consists of a powder called A.P.T.E. (addition of photons by transfer of energy) mixed with an epoxy resin is already known, this display being described by T. KANO in "Comptes rendus du colloque international sur les dispositifs et systèmes d'affichage alphanumérique" page 102 (Paris, April 1973). The use of a single diode in each segment is perfectly sufficient for illumination, because in the A.P.T.E. materials there occur a trap phenomenon of the infrared radiation which allow the visible emission to be present far from the infrared irradiation point.

The described ceramics are all suitable for forming segments for such a display by using small bars of said moulded ceramics with suitable dimensions. The segments may be moulded either separately or together with their support (as shown in the figures) in the latter case it may be necessary to shield the spacings between the segments by means of an opaque coating 7 such as a metal layer or an alloy layer or an organic lacquer.

As assitional advantage of the described ceramics is that in the external surface of the segments is moulded smooth, it is possible to apply thereto a multidielectric layer 6 which confines the infrared within the segments, which increawes the overall efficiency of the infrared-visible transformation.

What we claim is:

1. A rare earth ceramic having a microcrystal phase buried in a glassy phase for the conversion of radiation in the near-infrared band from about 0.85 to 1.06 $\mu$m into visible light, comprising a mixture of lead fluoride PbF$_2$, ytterbium oxide Yb$_2$O$_3$, at least one glass-forming oxide of an element selected from the group consisting of B$_2$O$_3$, SiO$_2$, P$_2$O$_5$, GeO$_2$, TeO$_2$ and at least one compound of a rare earth doping element chosen as a function of the desired emission colour, selected from the group consisting of a compound containing thulium ions $Tm^{3+}$ for a blue emission mixture;

a compound containing erbium ions $Er^{3+}$ for a green emission mixture;

a compound containing holmium ions $Ho^{3+}$ for a green emission mixture;

a compound containing erbium ions $Er^{3+}$ for a red emission mixture, whereby the oxygen ions from the oxides are exclusively located in the glassy phase while ytterbium and the rare earth doping element are exclusively located in the microcrystal phase.

2. A rare earth ceramic as claimed in claim 1, wherein the compound of the rare earth element is an oxide or a fluoride.

3. A rare earth ceramic having a microcrystal phase buried in a glassy phase for the conversion of radiation in the near-infrared band from about 0.85 to 1.06 $\mu$m into visible light, comprising a mixture of lead fluoride $PbF_2$, ytterbium oxide $Yb_2O_3$, at least one glass-forming oxide of an element selected from the group consisting of $B_2O_3$, $SiO_2$, $P_2O_5$, $GeO_2$, $TeO_2$ and at least one compound of a rare earth doping element chosen as a function of the desired emission colour, selected from the group consisting of a compound containing thulium ions $Tm^{3+}$ for a blue emission mixture;

a compound containing erbium ions $Er^{3+}$ for a green emission mixture;

a compound containing holmium ions $Ho^{3+}$ for a green emission mixture:

a compound containing erbium ions $Er^{3+}$ for a red emission mixture, in which the relative proportion of glass-forming oxides in the finished ceramic ranges about from 6 to 35% by weight, the relative proportion of ytterbium oxide to the glass-forming oxides and lead fluoride ranges about from 5 to 20% by weight and the proportion of rare earth doping element compound in the form of an oxide to the finished ceramic ranges from about 0.01 to 5% by weight for oxide $Er_2O_3$
0.003 to 0.25% by weight for oxide $Tm_2O_3$
0.01 to 2% by weight for oxide $Ho_2O_3$ whereby the oxygen ions from the oxides are exclusively located in the glassy phase while ytterbium and the rare earth doping element are exclusively located in the microcrystal phase.

4. A rare earth ceramic having a microcrystal phase buried in a glassy phase for the conversion of radiation in the near-infrared band from about 0.85 to 1.06 $\mu$m into visible light, comprising a mixture of lead fluoride $PbF_2$, ytterbium oxide $Yb_2O_3$, at least one glass-forming oxide of an element selected from the group including $B_2O_3$, $SiO_2$, $P_2O_5$, $GeO_2$, $TeO_2$, at least one oxide of an optically neutral rare earth chosen from the group consisting of Y, La, Gd, Lu and at least one compound of a rare earth doping element chosen as a function of the desired emission colour, selected from the group consisting of a compound containing thulium ions $Tm^{3+}$ for a blue emission mixture;

a compound containing erbium ions $Er^{3+}$ for a green emission mixture;

a compound containing holmium ions $Ho^{3+}$ for a green emission mixture;

a compound containing erbium ions $Er^{3+}$ for a red emission mixture;

whereby the oxygen ions from the oxides are exclusively located in the glassy phase while ytterbium and the rare earth doping element are exclusively located in the microcrystal phase.

5. A rare earth ceramic as claimed in claim 4, wherein the molar ratio of the optically neutral rare earth oxide to the ytterbium oxide ranges about from 1 to 10%.

6. A rare earth ceramic as claimed in claim 5, wherein the molar ratio of the optically neutral rare earth oxide to the ytterbium oxide is 2%.

* * * * *